United States Patent Office 3,294,863
Patented Dec. 27, 1966

3,294,863
1,2-BIS(EPOXYALKYL)CYCLOBUTANE-
POLYEPOXIDE COMPOSITION
William De Acetis, Berkeley, and Roy T. Holm, Orinda,
Calif., assignors to Shell Oil Company, New York, N.Y.,
a corporation of Delaware
No Drawing. Filed May 29, 1963, Ser. No. 284,013
5 Claims. (Cl. 260—830)

This invention relates to novel epoxy compounds and their production. More particularly, it relates to certain novel polyepoxycyclobutane compounds and to curable resin-forming epoxy compositions containing them.

The art is replete with polyepoxides which are curable to resin materials. The most common ones are glycidyl ethers of polyhydric phenols which form, upon addition of a suitable curing agent, resinous materials of excellent physical and adhesive strength. However, such polyepoxides are usually either solid or substantially solid at atmospheric temperatures. When employed for adhesive purposes, it is necessary the polyepoxide containing the hardening agent be at least spreadably fluid in order that it can be applied to surfaces desired to be united. Such glycidyl ethers may be heated to spreadable consistency and applied in this molten condition, but such a procedure often is undesirable especially with such ethers which are curable at ordinary atmospheric temperature. Obtaining fluidity by incorporation of an inert volatile solvent with the glycidyl ether is objectionable since the solvent cannot evaporate from the composition contained as an adhesive layer between impervious surfaces of objects being glued together. Moreover, the presence of even minute portions of such volatile solvents retained in the ether greatly reduces the strength of the cured resin. Likewise, the use of inert non-volatile solvents such as dibutyl phthalate to obtain fluidity also is unsatisfactory because the cured resin therefrom similarly has poor strength. Better results are sought by incorporating a fluidizing proportion of a compatible normally liquid substantially non-volatile curable diepoxy compound with the glycidyl ethers of polyhydric phenols.

It is a principal object of this invention to provide a novel class of polyepoxides which are efficacious reactive diluents for epoxy resin forming materials.

Other objects of the invention will be apparent and the objects better understood from the description of the invention as given hereinafter.

It has now been found that a novel class of polyepoxy compounds, 1,2-di(1,2-epoxyalkyl)cyclobutanes of from 8 to 10 carbon atoms greatly enhance desirable properties of thermosetting epoxy compositions when included as a reactive diluent.

The novel compounds of the invention are prepared by epoxidizing 1,2-di(1,2-alkenyl)cyclobutanes of from 8 to 10 carbon atoms with a suitable epoxidizing agent, such as peracetic acid. The 1,2-alkenyl group contains from 2 to 3 carbon atoms. The epoxy compounds can be represented by the formula

wherein the R's are independently selected from hydrogen, methyl and 1,2-epoxyalkyl of 2 to 3 carbon atoms, two of the R's and only two being 1,2-epoxyalkyl bonded to adjacent ring C-atoms. The compound should contain from 8 to 24 carbon atoms.

A 1,2-epoxy R-radical linked to one cyclobutane ring C-atom and a methyl R-radical linked to an adjacent ring C-atom may be joined directly to each other to provide an epoxy-containing cyclopentane ring fused with the cyclobutane ring.

The di-alkenylcyclobutanes, wherein alkenyl is meant to include alkendiyl, that is 1,3-divalent alkene such as 1,3-propenylene, which are used as precursors of the epoxy compounds of the invention, are obtained by the photochemical dimerization, homo- or co- of conjugated unsaturated aliphatic hydrocarbons of 4 to 5 carbon atoms, such as the 1,3-alkadienes, e.g., 1,3-butadiene, 1,3-n-pentadiene, 2-methyl-1,3-butadiene (isoprene), and cyclopentadiene, in the presence of a suitable sensitizer, such as a suitable ketone, e.g., acetophenone.

Illustrative polyalkenylcyclobutanes are: 1,2-divinylcyclobutane from 1,3-butadiene; 1,2-di-isopropenyl cyclobutane; 1,2-dimethyl - 1,2 - divinylcyclobutane and 1-methyl-1-vinyl-2-isopropenylcyclobutane from isoprene; 1-vinyl-2-isopropenylcyclobutane and 1-methyl-1,2-divinylcyclobutane from codimerization of butadiene and isoprene; and tricyclo [5,3,0,0$^{2,6}$]deca-3,9-diene from cyclopentadiene. The 1,2-dialkenylcyclobutanes are generally the principal isomer derived from the 1,3-alkadienes.

Exemplary di-epoxyalkylcyclobutanes are 1,2-bis(epoxyethyl)cyclobutane, 1,2-bis(1 - methylepoxyethyl)cyclobutane, 1,2 - dimethyl-1,2-bis(epoxyethyl)cyclobutane, 1-epoxyethyl - 2-(1-methylepoxyethyl)cyclobutane, 1-methyl-1-epoxyethyl - 2 - (epoxyisopropyl)cyclobutane and 3,4,9,10-diepoxytricyclo[5,3,0,0$^{2,6}$] decane.

In addition to being useful reactive diluents for epoxy resins, the novel di-epoxyalkylcyclobutanes of this invention are especially useful in other applications. They can be condensed with alkylene oxides and glycols to provide polyalkylene oxyglycols and the like containing cyclobutane groups in the polymer chain which modify the properties of the product. The epoxy groups can be hydrolyzed to alcohol groups. For example, 1,2-bis (epoxyethyl)cyclobutane is hydrolyzed to 1,2-bis(1,2-dihydroxyethyl)cyclobutane, which in turn, is useful as a hydrocarbon distillate anti-icant and useful for the synthesis of polyester and polyurethane plastics and resins.

The epoxidation of the unsaturated radicals attached to the cyclic butane ring may be advantageously carried out be reacting the unsaturated cyclic butane with any suitable epoxidizing agent for epoxidizing olefinically unsaturated hydrocarbons, as is well known in the art. Suitable epoxidizing agents, in addition to peracetic acid, include other organic peracids such as perbenzoic acid, monoperphthalic acid and the like.

The amount of the epoxidizing agent employed will vary over a considerable range depending on the type of product desired. In general, one should employ at least one mole of the epoxidating agent, such as described above, for every ethylenic group to be epoxidized.

The reaction period is not critical as long as the minimum period of time necessary for the reaction to be completed is employed. No adverse effects have been observed when the time of reaction is excessive. The degree of the completeness of the reaction is easily obtained by titrating a small sample of the intermediate product by the well-known Kingzett procedure (Kingzett, C. J., J. Chem. Soc., 37,802 (1880)).

It is preferred to carry out the epoxidation reaction in a suitable mutual solvent for the reactants and product. Chloroform is an especially useful solvent for the purposes, but other materials such as ethyl ether, dichloroethane, benzene, ethyl acetate and the like may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and epoxidating agent selected. It is generally desirable to maintain the temperature between −20° C. and 100° C. and more preferably between 10° C. and 60° C.

Although atmospheric pressure is preferred, the pressure, through the use of a closed container can be varied considerably without adversely affecting the reaction.

The cyclobutane compounds of this invention can be employed advantageously, independently, or in combination as a reactive diluent with any polyepoxide material. The polyepoxides may be saturated or unsaturated, aliphatic, cycloaliphatic, aromatic or heterocyclic and may be substituted if desired with substituents, such as chlorine atoms, hydroxyl groups, ether radicals and the like. They may also be monomeric or polymeric.

The polyepoxides may be exemplified by the following:

vinyl cyclohexene dioxide
epoxidized mono-, di-, and triglycerides butadiene dioxide
1,4-bis(2,3-epoxypropoxy)benzene
4,4'-bis(2,3-epoxypropoxy)diphenyl ether
1,8-bis(2,3-epoxypropoxy)octane
1,4-bis(2,3-epoxypropoxy)cyclohexane
1,3-bis(4,5-epoxypentoxy)-5-chlorobenzene
1,4-bis(3,4-epoxybutoxy)-2-chlorocyclohexane
diglycidyl thioether
diglycidyl ether
ethylene glycol diglycidyl ether
resorcinol diglycidyl ether
1,2,5,6-diepoxyhexene-3
1,2,5,6-diepoxyhexane, and
1,2,3,4-tetra(2-hydroxy-3,4-epoxybutoxy)butane Other examples include the glycidyl polyethers of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2-bis(2,3-epoxypropoxyphenyl)propane is obtained by reacting the bis-phenol, 2,2-bis(4-hydroxyphenyl)propane with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydroxynaphthalene.

Still a further group of the polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetriol, pentaerythritol, di- and tripentaerythritol, polyglycerol, dulcitol, inositol, carbohydrates, methyltrimethylolpropane, 2,6-octanediol, 1,2,4,5-tetrahydroxycyclohexane, glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether, pentaerythritol tetraglycidyl ether and sorbitol tetraglycidyl ether.

A further group of the polyepoxides comprises the polyepoxy polyesters obtained by esterifying alkyl epihalohydrin, e.g., epichlorohydrin and caustic with a polycarboxylic acid, e.g., the diglycidyl ester of adipic acid, the diglycidyl ester of malonic acid, and the diglycidyl ester of succinic acid.

Other polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyepoxides comprises the hydroxy-substituted polyepoxy polyethers obtained by reacting, preferably in an alkaline medium, a slight excess, e.g., 5 to 3 mol excess, of a halogen-containing epoxide as described above, with any of the aforedescribed polyhydric phenols, such as resorcinol, catechol, 4,4'dihydroxy biphenyl, and the like.

Other polymeric polyepoxides include the polymers and copolymers of the epoxy-containing monomers possessing at least one polymerizable ethylenic linkages. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl)ether, allyl glycidyl ether-vinyl acetate copolymer and poly[4-(2',3'-glycidyloxy)styrene].

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of base, such as sodium aluminate.

It is preferred to use 10 parts of 1,2-bis(epoxyalkyl)cyclobutane/100 parts of polyepoxide resin although ratios ranging from 90 parts of 1,2-bis(epoxyalkyl)cyclobutane/10 parts of polyepoxide to 1 part 1,2-bis(epoxyalkyl)cyclobutane/99 parts of polyepoxide are satisfactory.

It is also within the scope of this invention to include fillers, for example, powdered metal oxide fillers, such as aluminum oxide and iron oxide; fibrous fillers, such as asbestos, milled glass fibers, nylon and cellulose floc in amounts which may satisfactorily vary from 1 to 30 parts of filler/100 parts of polyepoxide.

In using the compositions of the invention, there is added thereto a hardening agent. Upon the addition of the hardening agent, the composition begins to cure and harden even at ordinary temperatures. A great variety of substances are suitable hardening agents for the resin-forming ingredients. Such compositions are alkalies like sodium or potassium hydroxide; alkali phenoxides like sodium phenoxide; carboxylic acids or anhydrides such as formic acid, oxalic acid or phthalic anhydride; Friedel-Craft metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and tetraethyl tetraphosphate; and amino compounds such as triethyl amine, ethylene diamine, diethyl amine, diethylene triamine, triethylene tetramine, dicyandiamide, melamine and the like. The hardening agent is added and mixed in with the composition in order to effect hardening. The amounts vary considerably depending upon the particular agent employed. For the alkalies or phenoxides, 2 to 4 percent is suitable. With phosphoric acid and esters thereof, good results are obtained with 1 to 10 percent added. The amino compounds are used in amounts of about 5 to 15 percent and the others involve addition of about 1 to 20 percent.

The following specific examples will serve to illustrate more clearly the application of the invention, but they are not to be construed as in any manner limiting it.

*Example I.—Preparation of 1,2-divinyl cyclobutane*

62 grams of acetophenone was placed in a specially constructed flask containing two side arms and a well for an ultra-violet light source. The flask was evacuated several times at elevated temperatures. 386 grams of butadiene was distilled into the flask. The flask was placed in a Dewar container of cooling liquid and irradiated with a 200-watt Hanovia lamp. The bath temperature was maintained at from ($-6°$) C. to ($-9°$) C. and the irradiation continued for 5 days. The unreacted butadiene was distilled off leaving 100 grams of clear colorless bottoms. Fractionation of the bottoms produced 18 grams of 1,2-divinyl cyclobutane, B.P. 107° C. (refractive index $n^{25}d = 1.4438$).

*Example II.—Preparation of 1,2-bis(epoxyethyl)butane*

Ten grams (0.0926 mole) of 1,2-divinyl cyclobutane was dissolved in 100 ml. of chloroform and while stirring a solution of 37 grams (0.194 mole) of 40 percent peracetic acid and 3.4 grams of 20 percent sodium acetate was added dropwise. The kettle temperature was maintained at 25° C. with a water bath during the 22 minute addition process. After 22 hours at 25° C. the mixture was washed with water and sodium bicarbonate solution and then dried over magnesium sulfate and the chloroform distilled in a spinning band column at atmospheric pressure at a kettle temperature of 130° C.

The weight of the crude product obtained was 10.0 grams. The product analyzed 0.828 equivalent of epoxy group/100 grams of sample.

*Example III*

8.5 grams (0.0787 mole) of 1,2-divinyl-cyclobutane was dissolved in 100 grams of chloroform and while stirring a solution of 34 grams (0.179 mole) of 40 percent peracetic acid and 3.12 grams of 20 percent sodium acetate was added dropwise. As in Example I, the temperature was maintained at 25° C. during the 27 minute addition period. After 24 hours the resulting material was washed and the product from Example I and the product obtained here were combined and distilled through a spinning band column. After a small forecut, the 1,2-bis(epoxyethyl)cyclobutane boiled at 110° C. (25 mm. Hg). This fraction weighed fourteen grams and had the following analysis:

|  | Found | Theory for $C_8H_{12}O_2$ |
|---|---|---|
| C | 68.5 | 67.53% |
| H | 8.6 | 8.57% |
| Epoxy value | 1.42 | 1.43 equiv./100 g. |

*Example IV.—Use of bis(epoxyethyl)cyclobutane*

(a) 4.5 grams of a polyfunctional bisphenol A type epoxy resin having an epoxide equivalent of 185–192 and a viscosity of 135 poises at 25° C., was mixed thoroughly with 0.5 gram bis(epoxyethyl)cyclobutane and 0.8 gram of m-phenylenediamine. The viscosity of this composition before adding the m-phenylenediamine was 10 poises at 25° C.

(b) 5.0 grams of the bisphenol A type epoxy resin of (a) was mixed thoroughly with 0.7 gram of m-phenylenediamine.

(c) 2 grams of bis(epoxyethyl)cyclobutane was mixed thoroughly with 0.76 gram of m-phenylenediamine.

Compositions a, b, and c were stored at 30–40° C. for a period of 2 days to gel them. The gels formed were heated in an oven at 70–80° C. for two hours, then at 150° C. for 15 hours.

The results in Table I illustrate the relative hardness (Barcol hardness) of the cured samples at various temperatures:

TABLE I

| Temperature, °C. | Barcol Hardness | | |
|---|---|---|---|
| | Sample | | |
| | A | B | C |
| 25 | 42 | 38 | 60 |
| 100 | 28 | 20 | 46 |
| 120 | 20 | 12 | 40 |
| 140 | 16 | 5 | 30 |

It can readily be seen that the 1,2-bis(epoxyethyl)cyclobutane has a much higher hardness at elevated temperatures than the bisphenol A derived resin. Also, the addition of 1,2-bis(epoxyethyl)cyclobutane to the bisphenol A derived resin improves its hot hardness and it is consequently a valuable diluent.

We claim as our invention:

1. A composition comprising 1,2-bis(epoxyalkyl)cyclobutane wherein each epoxyalkyl group contains from 2 to 3 carbon atoms and a polyepoxide having a plurality of vic-epoxy groups, the amount of the 1,2-bis(epoxyalkyl)cyclobutane varying from 1% to 90% of the combined mixture.

2. A composition comprising 1,2-bis(epoxyalkyl)cyclobutane wherein each epoxyalkyl group contains from 2 to 3 carbon atoms and a polyglycidyl polyether of a polyhydric phenol, the amount of the 1,2-bis(epoxyalkyl)cyclobutane varying from 1% to 90% of the combined mixture.

3. A composition comprising 10 parts by weight of 1,2-bis(epoxyalkyl)cyclobutane wherein each epoxyalkyl group contains from 2 to 3 carbon atoms and 100 parts by weight of polyglycidyl polyether of a polyhydric phenol.

4. A cured composition obtained by heating the composition of claim 3 with an epoxy curing agent.

5. A cured composition in accordance with claim 4 wherein the epoxy curing agent is m-phenylenediamine.

References Cited by the Examiner

UNITED STATES PATENTS 3,235,620  2/1966  Phillips et al. _____ 260—830

WILLIAM H. SHORT, *Primary Examiner.*

T. D. KERWIN, *Assistant Examiner.*